United States Patent [19]  
Cayol et al.

[11] 3,997,395  
[45] Dec. 14, 1976

[54] NUCLEAR FUEL ASSEMBLY

[75] Inventors: André Cayol, Montrouge; Georges Clottes, Manosque; Pierre Loriot; Jean Skok, both of Aix en Provence, all of France

[73] Assignee: Commissariat a l'Energie Atomique, Paris, France

[22] Filed: May 23, 1974

[21] Appl. No.: 472,803

Related U.S. Application Data

[63] Continuation of Ser. No. 395,454, Sept. 10, 1973, abandoned.

[52] U.S. Cl. .................................. 176/78; 176/81
[51] Int. Cl.² ......................................... G21C 3/16
[58] Field of Search ................ 176/76, 78, 40, 81

[56] References Cited
UNITED STATES PATENTS

| | | | |
|---|---|---|---|
| 3,215,606 | 11/1965 | Silvester | 176/78 |
| 3,607,642 | 9/1971 | Murdock | 176/78 |
| 3,629,066 | 12/1971 | Andersson et al. | 176/81 |
| 3,677,893 | 7/1972 | Huebotter et al. | 176/78 |
| 3,930,940 | 1/1976 | Cayol et al. | 176/81 |

*Primary Examiner*—Harvey E. Behrend
*Attorney, Agent, or Firm*—Cameron, Kerkam, Sutton, Stowell & Stowell

[57] ABSTRACT

The fuel assembly comprises at least one cluster of canned-fuel pins disposed on a uniform lattice within a sleeve defining a duct through which a coolant is circulated. Each fuel pin is provided at least over the greater part of its length with a helical spacer member which determines the minimum spacing between the fuel pin and the adjacent pins or the sleeve. The internal face of the sleeve is provided with recesses in which the spacer members of the lateral pins of the cluster are partially engaged.

The fuel assembly finds an application in nuclear reactors of the liquid-sodium-cooled fast breeder type.

5 Claims, 3 Drawing Figures

NUCLEAR FUEL ASSEMBLY

This is a continuation, of application Ser. No, 395,454 filed Sept. 10, 1973 now abandoned.

This invention relates to a fuel assembly for nuclear reactors having high power density such as breeder reactors which are cooled by a circulation of liquid metal. Assemblies of this type comprise at least one cluster of pins of substantial length consisting of canned fuel (fissle or fertile material), the fuel pins being disposed on a uniform lattice (usually hexagonal) and contained within a sleeve through which the coolant flows. The minimum spacing of the pins in each cluster is determined by means of spacer members (wires, small-diameter tubes or fins) which are wound on each fuel pin in a helix having a coarse pitch.

The U.S. Patent Application Ser. No. 96782 filed on Dec. 10, 1970, now U.S. Pat. No. 3,930,940, describes and claims a nuclear fuel assembly of the above-mentioned type which is intended to reduce conditions of unbalance in heating of the coolant which is circulated through different sub-channels defined by the fuel pins both between each other and with the sleeve. This nuclear fuel assembly comprises at least one cluster of canned-fuel pins disposed on a uniform lattice within a sleeve through which the coolant is circulated, each fuel pin being provided over at least the greater part of its length with a helical spacer member which determines the spacing between said fuel pin and the adjacent pins or the sleeve. The assembly is primarily distinguished by the fact that the radial distance to which each spacer member of a lateral fuel pin of the cluster projects with respect to the pin is of smaller value in the zones in which said spacer member is applied against the sleeve.

The aim of this invention is to provide a nuclear fuel assembly which meets practical requirements more effectively than those described in the patent cited in the foregoing, especially by virtue of the fact that said assembly can be put to use irrespective of the number, diameter, lattice and theoretical spacing of the fuel assembly pins and that it permits the achievement of the same result by means of fuel pins which are all identical (although this conditon is not essential).

To this end, the invention proposes a nuclear fuel assembly comprising at least one cluster of canned-fuel pins disposed on a uniform lattice within a sleeve defining a duct through which a coolant is circulated, each fuel pin being provided at least over the greatest part of its length with a helical spacer member which determines the minimum spacing between said pin and the adjacent pins or the sleeve, said fuel assembly being primarily characterized in that the sleeve is provided on the internal face thereof with recesses in which the spacer members of the lateral pins of the cluster are partially engaged.

The recesses are advantageously constituted by grooves of concave shape which surround the spacer members and are arranged in rows, the distance between two successive grooves of one row being equal to the winding pitch of the spacer members.

In accordance with one particular method of application of the invention, the sleeve is constituted by an outer jacket and by plates which are placed between the jacket and the fuel cluster. Erection of the asembly is facilitated by means of this arrangement. Thus, said plates are fitted on to the fuel cluster, whereupon the assembly as thus constituted is inserted by sliding within the jacket.

The outer jacket can either have a substantially constant thickness or have a smaller thickness in the downstream portion thereof, namely in the direction of flow, as described in the U.S. Pat. No. 3,795,579.

Again in accordance with a particular method of application of the invention, the internal face of the sleeve is provided with longitudinal splines each projecting between two adjacent lateral fuel pins so as to reduce the cross-sectional area of the sub-channel correpsonding to the circulation of coolant between the two fuel pins; these projecting splines perferably have a triangular transverse cross-section but other shapes may be contemplated.

A more complete understanding of the invention will be gained from the following description of a fuel assembly in accordance with one embodiment of the invention, this description being given by way of explanatory illustration without any limitation being implied, reference being made to the accompanying drawings, wherein.

Figure 1:
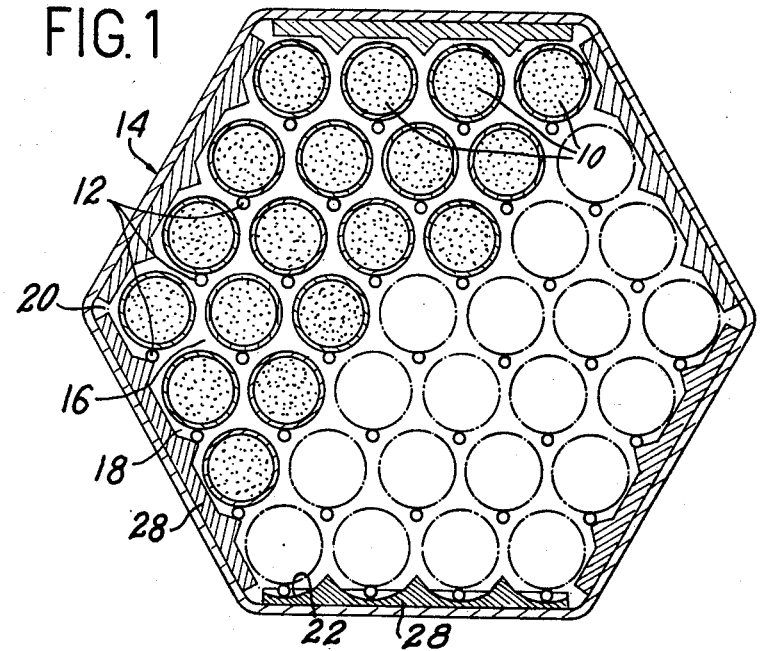
FIG. 1 shows very diagrammatically a transverse cross-section of a fuel assembly for a breeder reactor which is cooled by a circulation of liquid sodium.

The fuel assembly which is illustrated in transverse cross-section in FIG. 1 conforms to a general structure which is in very wide use at the present time. The assembly consists of a cluster of canned nuclear fuel pins 10 of substantial length which are located at the nodes of a uniform triangular lattice. The fuel pins are carried by a support grid (not shown in FIG. 1), said grid being attached to a sleeve 14 which limits a duct for the circulation of coolant. The minimum relative spacing of the fuel pins is determined by means of spacing system which comprises in the case of each fuel pin 10 a metal wire 12 which is wound in a helix on the can and is applied against the cans of adjacent fuel pins or against the wall of the sleeve.

The coolant circulates in a general direction at right angles to the plane of FIG. 1 through a series of sub-channels which communicate with each other and are delimited either solely by fuel pins or by fuel pins and the sleeve. In the case which is illustrated, namely in which the fuel-pin lattice is triangular and in which the sleeve has a hexagonal transverse cross-section, the sub-channels can be divided into three groups:

A first group is constituted by the sub-channels 16 which have a generally triangular shape, each sub-channel being formed by the space which is provided for the coolant by three adjacent fuel pins which are located at the apices of a triangle. Heating surfaces extend over one-half of the periphery of said sub-channels 16 which are provided in the greatest number; they will be referred-to hereinafter as "inner sub-channels" and the fuel pins which are surrounded only by sub-channels of this type will be referred-to as "inner fuel pins". The rate of flow through each inner sub-channel will be designated as $Di$.

A second group is constituted by the sub-channels 18 which will be referred-to as "edge sub-channels" and are each constituted by the space which is provided for the coolant by two fuel pins located at the periphery of the cluster (so-called "edge pins") and by the corresponding portion of one face of the sleeve 14. The sub-channels are limited by heating surfaces which represent in the same manner as the preceding sub-channels approximately one-half of the surface of one fuel pin. The rate of flow through each edge sub-channel will be designated as $Db$.

A third group is constituted by the sub-channels 20 or so-called "corner sub-channels", the number of which is equal to the number of corners of the transverse cross-section of the sleeve 14. Each sub-channel 20 is constituted by the space which is provided for the coolant between a "corner pin" located within a dihedron of the sleeve 14 and the two wall portions of the sleeve which constitute said dihedron. The coolant which flows through a corner sub-channel is in contact with a heat-transfer surface which represents 1/6 of the surface area of a fuel pin. The rate of flow of coolangt through a corner sub-channel will be designated as $Dc$.

Finally, the fuel pins and the sub-channels which form part of the second group and of the third group will be generally designated by the terms "lateral sub-channels" and "lateral fuel pins" in contrast to the "inner sub-channels" and "inner fuel pins".

If no consideration is given to the unitary pressure drops within the sub-channels which arise essentially from the spacer wires, the heating to which the coolant is subjected is identical within all the sub-channels which are assumed to be isolated from each other only on condition that the following relation is satisfied $$Di = Db = 3 Dc$$

If this condition is fulfilled, the outlet temperatures of the coolant will be substantially equal in all the sub-channels provided that the inlet temperatures are the same.

In this case of a conventional fuel assembly comprising pins which are all identical and a hexagonal-section sleeve in which the internal surface of each wall-section is flat and smooth, the equality relation given above is not satisfied when the cluster has maximum compactness (the spacer member of each fuel pin being in contact with the adjacent pins or with the sleeve). In fact, we have:

$$Di < 3 Dc < Db$$

Figure 2:
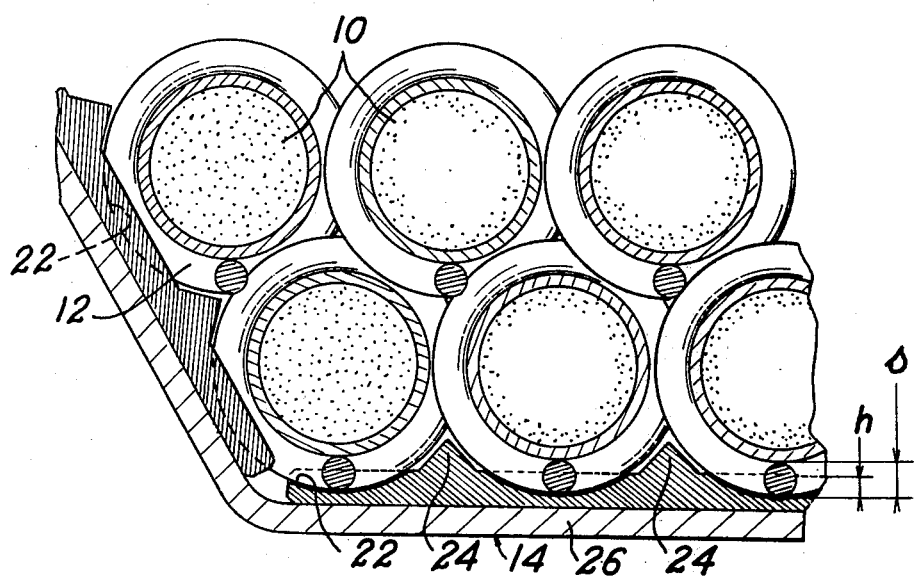
FIG. 2 is a large-scale detail view showing a portion of the transverse cross-section of the fuel assembly of FIG. 1.
Figure 3:
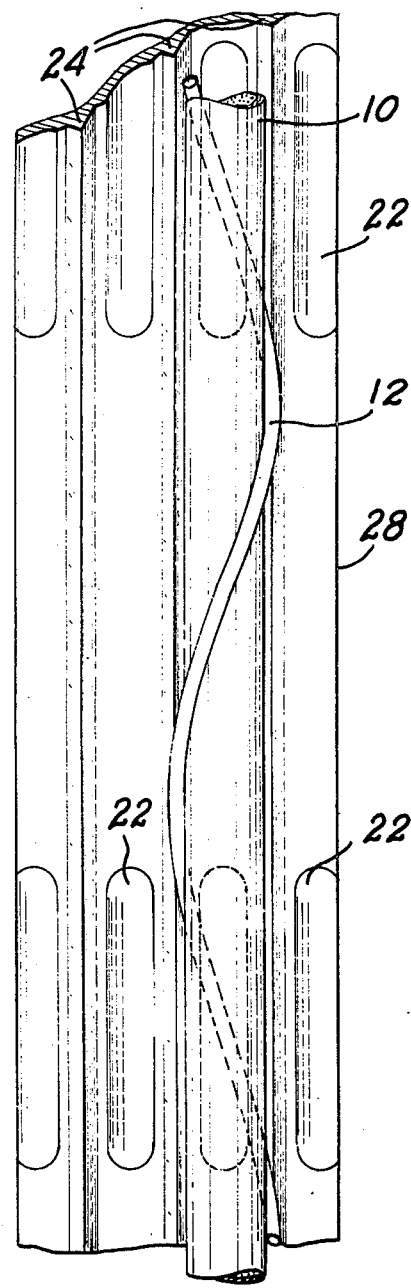
FIG. 3 shows diagrammatically in elevation a portion of a lateral fuel pin and a portion of the plate with which said pin cooperates in the assembly of FIG. 1.

The invention makes it possible to satisfy or at least to come close to the condition $Di = Db$ by giving the spacing between each edge pin and the sleeve a value which is smaller than the distance of projection of the spacer members. In the embodiment which is illustrated in FIGS. 1 and 2 (in which all the fuel pins are identical and carry spacer members which project to a constant distance over their entire length), this result is achieved by employing a sleeve having an internal surface which is not circumscribed about the cluster fitted with its spacer members as in the case of conventional fuel assemblies but would intersect these spacer members if said internal surface were flat and were not provided with any strengthening ribs. Since the design solution which consists in truncating the spacer members cannot be contemplated in practice, the sleeve is provided on its internal face with recesses in which are partially engaged the spacer wires of the lateral fuel pins of the cluster (edge pins and corner pins). These recessess 22 are shown in cross-section at the bottom of FIGS. 1 and 2. The length of said recesses in a direction parallel to the axis must obviously be sufficient to prevent flattening by compression of the spacer members 12. As a general rule, the length of said members will represent a fraction between 1/3 and 1/4 of the winding pitch of the spacer member. This fraction varies with the ratio of the depth $h$ of penetration of the spacer members into the sleeve and the distance $s$ of projection of said spacer members from the cans around which said members are helically wound.

It would be possible to satisfy the condition $Di = Db$ b adopting the above arrangement alone, but this would result in a value of the ratio $h/s$ which would usually be excessive. In the embodiment which is illustrated, the equality $Di = Db$ is achieved by maintaining a moderate value of the ratio $h/s$. To this end, the sleeve is provided on its internal face with longitudinal splines 24, each spline being intended to project between two adjacent lateral fuel pins (that is to say between two edge pins or between an edge pin and a corner pin). These projecting splines of substantially triangular shape in the embodiment which is illustrated cover a cross-sectional area such that the sub-channels which remain between the edge pins and the sleeve should have a cross-sectional area which is substantially equal to that of the inner sub-channels.

By providing the corners of the sleeve 14 with a suitable profile, the condition $Di = 3 Dc$ can also be achieved at least in an approximate manner.

It would be possible to construct the sleeve in a single piece but the result thereby achieved would be to complicate the erection of the assembly. In point of fact, the sleeve 14 and the lateral fuel pins are placed in interfitting relation, thereby preventing any relative longitudinal motion of the cluster and the sleeve. It would consequently prove necessary to form the sleeve on the cluster. In order to avoid this requirement which causes considerable inconvenience since it may entail the need to work in a protective atmosphere and which also impairs the strength of the sleeve, it is an advantage to construct said sleeve in a plurality of assembled parts. In the embodiment which is illustrated in the figures, the sleeve comprises a thin outer jacket 26 having a constant thickness and flat walls, and plates 28 which are six in number (it would clearly be possible to employ only two or three plates each assigned to a number of faces of the fuel cluster). These plates have a flat external face which is intended to be applied against the jacket 26 and a face provided with recesses constituted by grooves 22 each having a semi-cylindrical bottom portion. Said plates are each of identical shape but their grooves are relatively displaced by 1/6 of a pitch in the longitudinal direction when passing from one face to an adjacent face. Said plates advantageously make provision in the corners of the sleeve for a sub-channel which complies with the condition $Di = 3 Dc$.

By making use of plates of this type, the erection of the fuel assembly is greatly simplified. Thus, once the fuel-pin cluster is formed, the plates are mounted on the faces of said cluster, whereupon the assembly is inserted into the jacket 26.

The invention is obviously not limited to the particular embodiment which has been described by way of example and it must be understood that the scope of this patent extends to alternative forms of all or part of the arrangements described in which remains within the definition of equivalent means.

What we claim is:

1. A nuclear fuel assembly consisting of a cluster of identical canned-fuel pins disposed on a uniform triangular lattice within a sleeve defining a duct through which a coolant is circulated, said sleeve having internal faces and plates in said sleeve between said internal faces and said pins, each fuel pin having over its length a helical spacer member which determines the minimum spacing between said pin and the adjacent pins or the sleeve, said spacer members being identical and projecting a constant distance over their lengths, said plates having on the internal faces thereof recesses in which the spacer members of the lateral pins of the cluster are partially engaged, said recesses being displaced by an interval equal to one-sixth of the pitch of said spacer members between two successive faces of said sleeve, said recesses being rows of grooves of concave shape surrounding the spacer members, the distance between two successive grooves of one row being equal to the winding pitch of said spacer members.

2. A fuel assembly according to claim 1, wherein the internal face of the sleeve is provided with longitudinal splines each projecting between two adjacent lateral fuel pins.

3. A fuel assembly according to claim 2, wherein the projecting splines have a substantially triangular transverse cross-section.

4. A fuel assembly according to claim 1, wherein the spacer member which is carried by a fuel pin if formed by a wire which is helically wound on said pin.

5. A fuel assembly according to claim 1, wherein the depth of the recesses is such that the rate of flow within an edge sub-channel delimited by two fuel pins and the sleeve is substantially equal to the rate of flow within an inner sub-channel delimited by three fuel pins.

* * * * *